Patented Mar. 22, 1938

2,111,808

UNITED STATES PATENT OFFICE 2,111,808

DIALYTIC PROCESS

Arthur W. Saddington and Arlie P. Julien, Syracuse, N. Y., assignors to The Solvay Process Company, New York, N. Y., a corporation of New York No Drawing. Application April 24, 1936, Serial No. 76,251

10 Claims. (Cl. 23—184)

This invention relates to the preparation of solutions by means of dialysis. It is particularly directed to improvements in the dialytic purification of caustic and similar materials.

Although it has been proposed to prepare caustic solutions such as aqueous sodium hydroxide and potassium hydroxide solutions, by passing a solution of the caustic on one side of a dialytic membrane and water on the other side thereof with the result that the caustic diffuses through the membrane at a greater rate than impurities such as sulfate, chloride, etc. and a relatively pure caustic solution is formed from the water and diffused caustic, in the practical application of this procedure to concentrated caustic solutions, it has been found exceedingly difficult to obtain a high degree of purification and a satisfactory rate of diffusion without rapid disintegration of the diaphragm. By employing a very heavy diaphragm a longer diaphragm life may be obtained, but with such a diaphragm the diffusion rate is low. Diaphragms suitably thin to yield a high degree of purification at a practical rate were found to be subject to exceedingly early failure. The present invention has as an objective elimination of these disadvantages of the dialytic purification process.

A study of early diaphragm failure has now led to the discovery that in many instances it is caused by blistering of the parchment membrane employed. Further, it has been found that this blistering of the parchment is not the result of any particular chemical action but is caused by the liberation of gas within the pores of the fiber during dialysis. Despite the fact that the solubility of air in water is very low, the solubility of air in concentrated caustic solution is much less and therefore the water, as it passes along the parchment and becomes more and more concentrated with caustic supplied by diffusion through the diaphragm, gives up its gas content, apparently within the diaphragm. Over an extended period of time a remarkably large volume of air is thus liberated, causing the felted fibers to be torn apart, and eventually puncturing the diaphragm. In view of the heat liberated by dilution of concentrated caustic during dialysis, the temperature of the liquids in the dialytic cell is elevated, and this reduces the solubility of gases in the solution and increases the volume or pressure of the gas liberated. These factors apparently aggravate the injurious action of the air and accelerate the destruction of the diaphragm.

As a result of extended dialytic purifications carried out with deaerated water, it has been found that blistering of the dialytic diaphragms may be completely avoided by employing for the dialysis a water which is relatively free of air or other gases.

It will be understood that our invention is applicable to dialytic processes other than that specifically described. Thus it is not limited to caustic as the solute nor to water as the solvent. However, with concentrated caustic solutions the objectionable character of dissolved gases is magnified by the weakening action of caustic on the diaphragm, particularly cellulose diaphragms such as parchmentized paper.

In the appended claims the term pure solvent has been employed not in the sense that no other constituents whatever are present but in the sense that undesirable constituents are absent. Thus, in the dialytic purification of caustic the water introduced will almost immediately contain caustic and initially may contain it or other unobjectionable constituents, for example, carbonate.

It will be recognized that the amount of injury resulting from dissolved gases depends upon the quantity of gas liberated along or in the membrane and accordingly this injury is small where solutions of low concentrations are being produced and where accordingly the gas solubility differential between the ingoing water and outgoing solution is small. The quantity of dissolved gas permissible in the water employed accordingly varies with the concentration of solution to be prepared. The water should contain not substantially more dissolved gases than may be dissolved in the solution being produced at the temperature of dialysis. By employing a water containing not more than about 4 parts per million by weight of dissolved gas ordinary parchmentized cellulose membranes have been employed over long periods in the dialytic preparation of concentrated caustic solutions without any signs of blistering and with a complete elimination of the failures resulting therefrom. The amount of air normally present in water is of course considerably greater than 4 parts per million; even distilled water may contain around 8.5 parts per million of oxygen or about 27 parts per million of total dissolved gases. However, by boiling water at ordinary atmospheric pressure, a water for dialysis containing as little as one part per million of dissolved gases may be readily obtained. Any other suitable method of eliminating gases may, of course, be employed. Thus a water sufficiently free from gases may be obtained by cooling the drips from an evaporator under high vacuum or by employing absorbents for gases.

Some gases react with alkaline solutions to form compounds which are readily soluble and therefore are not liberated in the diaphragm during dialysis. For example, carbon dioxide, if present in the water, will react with sodium hydroxide to form sodium carbonate which does not interfere with the dialysis and does not liberate gas at the diaphragm. Accordingly it is permissible to have such gases dissolved in the water employed in the dialysis provided of course that the salts formed are not undesirable in the product. Hence the water to be used for the dialysis may be obtained by cooling mixtures of steam and carbon dioxide to produce a water entirely suitable for use in accordance with the present invention where a small quantity of carbonate in the product is not objectionable. In order to distinguish this harmless type of gases from those which cause blistering of the dialytic diaphragm, the latter are hereinafter referred to as "non-acid gases" since in most cases it is the acid gases, or gases whose solutions in water may be considered theoretically to be acids, which react in alkaline solution with formation of non-gaseous materials. The usual non-acid gases, on the other hand, do not have this property.

The invention is especially applicable to preparation of solutions of more than 20% caustic (usually between 20% and 30% caustic) from more concentrated solutions, e. g. solutions containing more than 25% caustic.

The following examples illustrate the improved results obtained by use of our invention.

*Example 1.*—In a simple dialyzer comprising a vessel divided into two chambers by means of a parchmentized cellulose membrane of about 160 grams per square meter area, distilled water containing around 27 parts per million of total dissolved gases is passed slowly along the membrane in one of the chambers and in the other chamber an aqueous 50% NaOH solution containing as impurities small quantities of carbonate, chloride, silicate, aluminate, and iron all in solution is passed along the membrane in a direction generally countercurrent to the water. The rates of inflow of water and of sodium hydroxide solution are maintained about equal in parts by weight (1.5:1 by volume) and are so regulated that the liquid leaving the water chamber contains 25% to 27% NaOH. The liquid leaving the caustic chamber contains about 23% to 25% NaOH. The small percentage of chloride, silicate, aluminate, and iron impurities present in the introduced caustic liquor are for the most part retained on the caustic side of the membrane, a relatively minor proportion passing through with the sodium hydroxide. The caustic liquid leaving the water side of the dialyzer contains a substantially reduced proportion of these impurities in terms of the NaOH content. After the dialyzer has been operated for a period of around three days the dialytic membrane contains a number of swellings or blisters which tend to reduce the effectiveness of the purification and, if the process is continued, result in early destruction of the membrane. In many cases the diaphragm fails even within a three day operating period.

*Example 2.*—The process of Example 1 is repeated employing on the water side of the diaphragm cold water, which has previously been boiled at atmospheric pressure and contains only about 0.3 parts per million of oxygen corresponding to about 1 part per million of total dissolved gas. Under substantially the same conditions of operation as in Example 1, it is found that the early effectiveness of the purification treatment is maintained and a diaphragm of the same quality as that which, in Example 1, failed after about three days of operation, has an effective life of a month or more. An examination of the diaphragm after thirty days of operation shows no indication of blistering.

We claim:

1. In the preparation of an aqueous caustic solution by dialysis of the caustic into aqueous solvent, the improvement which comprises employing aqueous solvent free from gases in excess of the proportion soluble in the resultant solution.

2. In the preparation of a concentrated aqueous caustic solution by dialysis of caustic into dilute aqueous caustic solution, the improvement which comprises employing dilute aqueous caustic solution containing not more than about 4 parts per million by weight of dissolved non-acid gases.

3. In the purification of caustic by passing an impure concentrated caustic solution in dialytic relation to a caustic solution of lower caustic concentration in a pure solvent, the improvement which comprises introducing into said dialytic relation the pure solvent containing not more than about 4 parts per million by weight of dissolved non-acid gases.

4. The method of purifying caustic, which comprises passing an impure caustic solution having a caustic concentration around 50% along one face of a dialytic membrane and passing pure solvent containing not more than about 4 parts per million by weight of dissolved non-acid gases along the other side of said membrane, and regulating the flow of solvent to yield a final caustic concentration of at least 20% therein.

5. The method of preparing an aqueous sodium hydroxide containing between 20% and 30% NaOH from a more concentrated aqueous sodium hydroxide solution, which comprises passing the more concentrated sodium hydroxide solution along one side of a parchmentized cellulose dialytic membrane and passing pure aqueous solvent containing not more than 4 parts per million by weight of dissolved non-acid gases along the other side of said membrane at a rate regulated to yield a final NaOH concentration therein between 20% and 30%.

6. The method of preparing an aqueous potassium hydroxide containing between 20% and 30% KOH from a more concentrated aqueous potassium hydroxide solution, which comprises passing the more concentrated potassium hydroxide solution along one side of a parchmentized cellulose dialytic membrane and passing pure aqueous solvent containing not more than 4 parts per million by weight of dissolved non-acid gases along the other side of said membrane at a rate regulated to yield a final KOH concentration therein between 20% and 30%.

7. In the preparation of an aqueous caustic solution by passing an aqueous concentrated caustic solution containing more than 25% caustic in dialytic relation to a caustic solution of lower caustic concentration, the improvement which comprises employing dilute aqueous caustic solution containing not more than about 4 parts per million by weight of dissolved non-acid gases.

8. In the preparation of an aqueous caustic solution containing more than about 20% caustic from more concentrated aqueous caustic solution by passing the more concentrated caustic solution in dialytic relation to a caustic solution of lower caustic concentration, the improvement which comprises employing dilute aqueous caustic solution containing not more than 4 parts per million by weight of dissolved non-acid gases.

9. In the preparation of an aqueous caustic solution containing more than about 20% caustic from a concentrated aqueous caustic solution containing more than about 25% caustic by passing the more concentrated caustic solutions along one face of a parchmentized cellulose dialytic membrane and passing a more dilute aqueous caustic solution along the other face thereof, the improvement which comprises employing dilute aqueous solution containing not more than 4 parts per million by weight of dissolved non-acid gases.

10. The method of preparing an aqueous caustic solution containing between 20% and 30% caustic from a more concentrated aqueous caustic solution, which comprises passing the latter solution along one side of a dialytic membrane in one direction, passing water containing not more than 4 parts per million by weight of dissolved non-acid gases along the other side of the membrane in the opposite direction at a rate regulated to yield a final caustic concentration therein between 20% and 30%.

ARTHUR W. SADDINGTON.
ARLIE P. JULIEN.